(12) United States Patent
Brown et al.

(10) Patent No.: US 6,721,947 B1
(45) Date of Patent: Apr. 13, 2004

(54) SYSTEM, METHOD AND PROGRAM FOR PRODUCING A CUSTOMIZED RESPONSE

(75) Inventors: Frances C. Brown, Austin, TX (US); Richard Scott Schwerdtfeger, Round Rock, TX (US); Lawrence Frank Weiss, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,746

(22) Filed: Mar. 13, 2000

(51) Int. Cl.[7] .............................. G06F 9/00; G06F 17/00
(52) U.S. Cl. ........................ 718/100; 700/86; 700/90; 713/1; 713/7; 713/100
(58) Field of Search ................................. 709/100, 101, 709/102, 103, 104, 105, 107, 200; 700/86, 90; 713/100, 1, 2

(56) References Cited

U.S. PATENT DOCUMENTS

| 5,255,322 | A | | 10/1993 | Farinelli et al. ............... 381/84 |
| 5,550,735 | A | | 8/1996 | Slade et al. ............. 364/401 R |
| 5,564,005 | A | | 10/1996 | Weber et al. ................ 395/161 |
| 5,675,631 | A | | 10/1997 | Kaminsky et al. ............ 379/67 |
| 5,706,290 | A | | 1/1998 | Shaw et al. .................. 370/465 |
| 5,794,058 | A | | 8/1998 | Resnick .................. 395/750.05 |
| 6,085,120 | A | * | 7/2000 | Schwerdtfeger et al. ...... 700/90 |

FOREIGN PATENT DOCUMENTS

WO      WO97/28630      8/1997      ........... H04L/29/06

OTHER PUBLICATIONS

IBM TDB, "User Interface Palette", vol. 39, No. 01, Jan. 1996, pp. 25–27.

IBM TDB, "Method for Fast Playback of a Multimedia File", vol. 39, No. 02, Feb. 1996, p. 119.

* cited by examiner

*Primary Examiner*—Majid Banankhah
(74) *Attorney, Agent, or Firm*—Marilyn Smith Dawkins

(57) ABSTRACT

A system, method, and program allow the execution of a different response of an application extension manager without modifying the default response of the application extension manager. The application extension manager resides in system memory. The application extension manager allows an execution unit to execute a task or a series of tasks in an ordered list associated with an event. A task is a set of executable instructions associated with an event that may be executed by the execution unit. When an event occurs, the application extension manager acquires the task on top of the ordered list. The acquired task then becomes selected to be executed by the execution unit. The selected task returns a value which indicates whether the application extension manager should proceed to the next task. If the value indicates to proceed to the next task, the next task becomes the selected task and the above stated process is repeated.

16 Claims, 4 Drawing Sheets

Extension Manager Task Execution Flow

SYSTEM, METHOD AND PROGRAM FOR PRODUCING A CUSTOMIZED RESPONSE

FIELD OF THE INVENTION

This invention relates to customizing tasks that provide a deterministic response in conjunction with an executing application program, and, more particularly, to producing customized responses that can be used in lieu of or in addition to default responses.

DESCRIPTION OF THE RELEVANT ART

An application extension manager is a program that extends or enhances the functionality of a separately active application program. Customarily, the functionality that is being enhanced is the user interface. One type of enhancement may include redefining one or more keyboard keys for specific input events Other enhancements may include redefining output responses for specific events. An event my be triggered by activity internal to or external from an executing application. For example, an event may be initiated by user activity (e.g., a key stroke upon the computer keyboard) to a running application. Also, an event may be derived from the execution of a particular triggering line of code within an executing program. An event may also originate outside of any executing application such as from the system clock. Regardless of its origin, an event is defined as stimuli which causes the processor (otherwise referred to herein as the execution unit) to execute a set of instructions which defines a certain response. Such a certain response is also referred to herein as a deterministic response. Upon receiving a specific event, the processor preferably executes a set of instructions which defines a response to the specific event. Preferably, each event will produce a unique response.

An application extension manager is described in U.S. patent application Ser. No. 08/971,256, which is herein incorporated by reference. An example of an application extension manager is the Self Voicing Kit (SVK), which is currently available on the Internet at the following URL:

http://alphaworks.ibm.com/tech/svk

The Self Voicing Kit enhances a visually displayed user interface of a Java application by automatically speaking what is displayed Upon receiving a unique event, the processor executes a set of instructions read from the SVK to produce an audio output when presented to an appropriate synthesizer. There may be instances, however, where a user may want to modify the default audio output or response of an application extension manager such as the SVK. For example, the user may want to replace the default audio output or response of the application extension manger with a new customized audio output or response. It is important to note that the default response of the separately active application is different from the default response of the application extension manager. For example, suppose that the separate application is a hockey game. The separate application may have a default response of displaying the score of the hockey game when a goal is scored. The application extension manager may have a default response that describes a goal with the sound "goal!" Perhaps the user would rather hear "scores!" "Scores!" would be the customized response of the application extension manager. The user would have to customize the application extension manager by modifying the set of instructions that define the default response of the application extension manager so that when a goal occurs in the hockey game the application vocalizes the sound of "scores!" instead of "goal!" However, a disadvantage is that the user would have to modify the default response of the application extension manager each time a new response is needed. That is, the user would have to modify the set of instructions that define the default response.

Possibly the user may want to hear "goal!" if the home team scores but would want to here "scores!" if the visiting team scored. The disadvantage is that the application extension manager does not allow the execution of new responses, i.e. "scores!" to events that already had a default response, i.e. "goal!" without modifying the default response of the application extension manager.

Using another example, the application extension manager may have a default response that does not impart any sound response whenever a goal is scored. However, the user would like to hear the sound of "goal!" when a goal is scored instead of silence. A disadvantage though is that the user would have to modify the set of instructions that defines the default response of the application extension manager in order for the application to produce the sound "goal!" That is, the user would have to modify the default response of the application extension manager with a new response.

Another disadvantage is that the default response of the application extension manager would have to be modified when a user would like to prepend a new response to the default response corresponding with an event. It should be noted that the term "prepend" is used herein to mean appending a response to the beginning of a predefined response. For example, the hockey application might reply with "goal!" when either teams scores. However, the user would like to which team scored in conjunction with "goal!" Hence, the user might like to hear "home team goal!" or "visitor goal!" The user would have to modify the default response of the application extension manager, i.e. the set of instructions that defines the default response, in order to prepend a new response to the default response.

The disadvantages described above concerning an audio system may also apply to a palpable output system, such as one employing a Braille reading surface. In relation to an audio system, instead of the output being audio, the output is palpable. Palpable systems have similar disadvantages. A customized response requires modification of the default response of the application extension manager whether the customized response is a different response from the default response, a new response not provided by the default response, a response prepended to the default response or a conditional response with respect to the default response.

SUMMARY OF THE INVENTION

It is therefore an object of this invention to create a customized response without modifying a default response of an application extension manager in which the customized response is a new or augmented response.

It is a further object of the invention to enable a customized response to be prepended to the default response of an application extension manager without modifying the default response.

It is a further object of the invention to create a customized response that is a conditional response with respect to the default response.

The system, method, and program of the invention provides enhanced functionality to an application program running on a computer system without modifying the application program and without modifying an application extension manager that is running concurrently with the application program. The application extension manager may be a separate system program that is present for every application running in the system, or it may be an extension to the operating system. In a preferred embodiment, the functionality of a user interface of an application program is enhanced. For example, an extension to the user interface may entail creating a different deterministic response for a specific event. More specifically, a different response can be outputted other than the default response of the application extension manager to an audio speaker or palpable surface. It should be noted that although the preferred embodiments herein illustrate the ability to enhance the functionality of the user interface of an application program, the invention as described and claimed herein is also applicable to enhancing other areas of the program's functionality such as tracing or logging functionality or other functionality that involves events and associated tasks.

The application extension manager monitors all events regardless of whether or not the events are originating from within the application program or are originating external to the application. Each event that is being monitored is capable of causing the processor, i.e., an executing unit, to execute instructions. The application extension manager associates with each event a corresponding default task and one or more corresponding customized tasks. Each task is a set of executable instructions which cause a deterministic response. A default task is a set of instructions that defines a default response. A second type of task is a customized task. A customized task is a set of instructions that defines a customized response. Upon an occurrence of an event, at least one of the corresponding tasks is executed. In this way, an application extension manager can provide additional functionality, through each deterministic response, to an executing application program without modifying, i.e., independently of any modification to, the application program or the application extension manager.

Furthermore, each of the tasks could be executed according to an ordered list of the tasks such as a linked list. As such, each event has an ordered list of tasks associated with that particular event. In the ordered list of tasks that comprises tasks associated with a particular event, there exists one default task. The default task may, in some embodiments, have the capability of defining no response. Furthermore, the ordered list may or may not have one or more associated customized tasks. In other words, for some events, there may not be a customized response. In a preferred embodiment, the tasks are executed on a last-in-first-out basis. However, other embodiments may comprise other orderings. In the preferred embodiment, the default task for a specific event specified by the application extension manager is at the bottom of the list, which in some embodiments may be a stack. As such, the default task will get executed last. Other customized tasks will be executed in the reverse order in which they were added to the linked list. That is, the default task is the first task put onto the ordered list with the customized tasks put on top of the default task.

Each task has instructions, within its set of executable instructions, for indicating to the application extension manager such as through a returned value from task execution, whether or not the application extension manager is to execute the next task on the ordered list of tasks. If several tasks are to be executed in response to a given event, this enables multiple responses to prepended together for a single event. If one of the multiple tasks includes the default task of the application extension manager, this enables a customized response to be prepended to the default response of the application extension manager. If a customized response indicates that the next task is not to be executed, i.e., the customized task inhibits the execution of all later ordered tasks, including the default task, this enables the customized response to be a new response.

BRIEF DESCRIPTION OF THE DRAWINGS

Other objects and advantages of the invention will become apparent upon reading the following detailed description and upon reference to the accompanying drawings in which.

Figure 1:
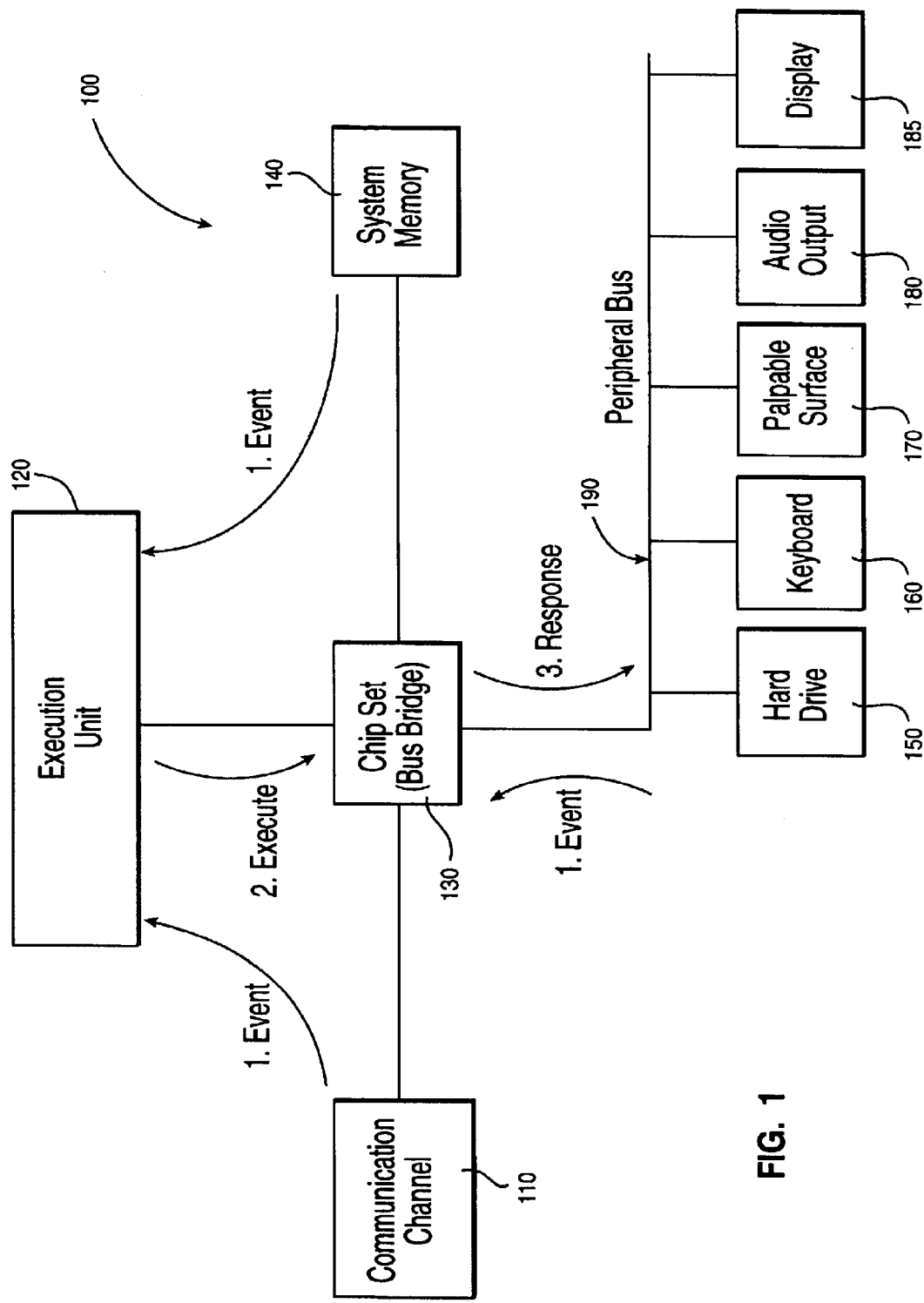
FIG. 1 is a block diagram of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 illustrates an exemplary computer system 100 which executes signals and produces corresponding output, e.g., acoustic or palpable output. The computer system 100 may include a communication channel 110, an execution unit 120, and a system memory 140 all coupled to a chip set 130 (i.e., bus interface unit). Chip set 130 may also be referred to as a bus bridge 130. Chip set 130 is further coupled to peripheral devices through a peripheral bus 190 (e.g. PCI, EISA, IDE, SCSI). Peripheral devices may include a hard drive 150, a keyboard 160, a palpable surface 170, an audio output 180 and a display 185. The palpable surface 170 responds to coded signals and produces an appropriate output such as, for example, movement of surface portions to aid sight-impaired users.

The computer system 100 produces an output detectable to the human senses. A sequence of activity is shown in FIG. 1, beginning with the generation of events forwarded to the execution unit 120, a reply generated by the execution unit, and a response forwarded to an output device, such as an audio output 180 or palpable surface 170. The event may be initiated by user activity (e.g. a key stroke upon the computer keyboard 160). Alternatively, the event can be derived from execution of a particular triggering line of code within a program stored in computer memory 140 or transmitted over channel 110. Regardless of its origin, an event is defined as stimuli which causes the execution unit 120 to execute the algorithm of the application extension manager 200 discussed below in reference to FIG. 2.

The execution unit 120, upon receiving an event, implements an algorithm managed by an application extension manager 200 that resides in system memory 140 as discussed below in reference to FIG. 2. The algorithm may cause the execution unit 120 to produce an acoustic signal when presented to an appropriate transducer, such as an audio output 180. The algorithm may also be used to produce, for example, a signal that causes pins to move up and down when presented to surface 170.

Bus bridge 130 is utilized to provide an interface between the various buses connected thereto. For example, transactions might arise which begin by an event generated by a particular line of code contained on a storage media within or outside of computer system 100. The event thus triggered can be sensed according to the arrows shown in FIG. 1 to an execution unit 120, which will cause the algorithm to be managed by the application extension manager 200 as discussed below in reference to FIG. 2.

Figure 2:
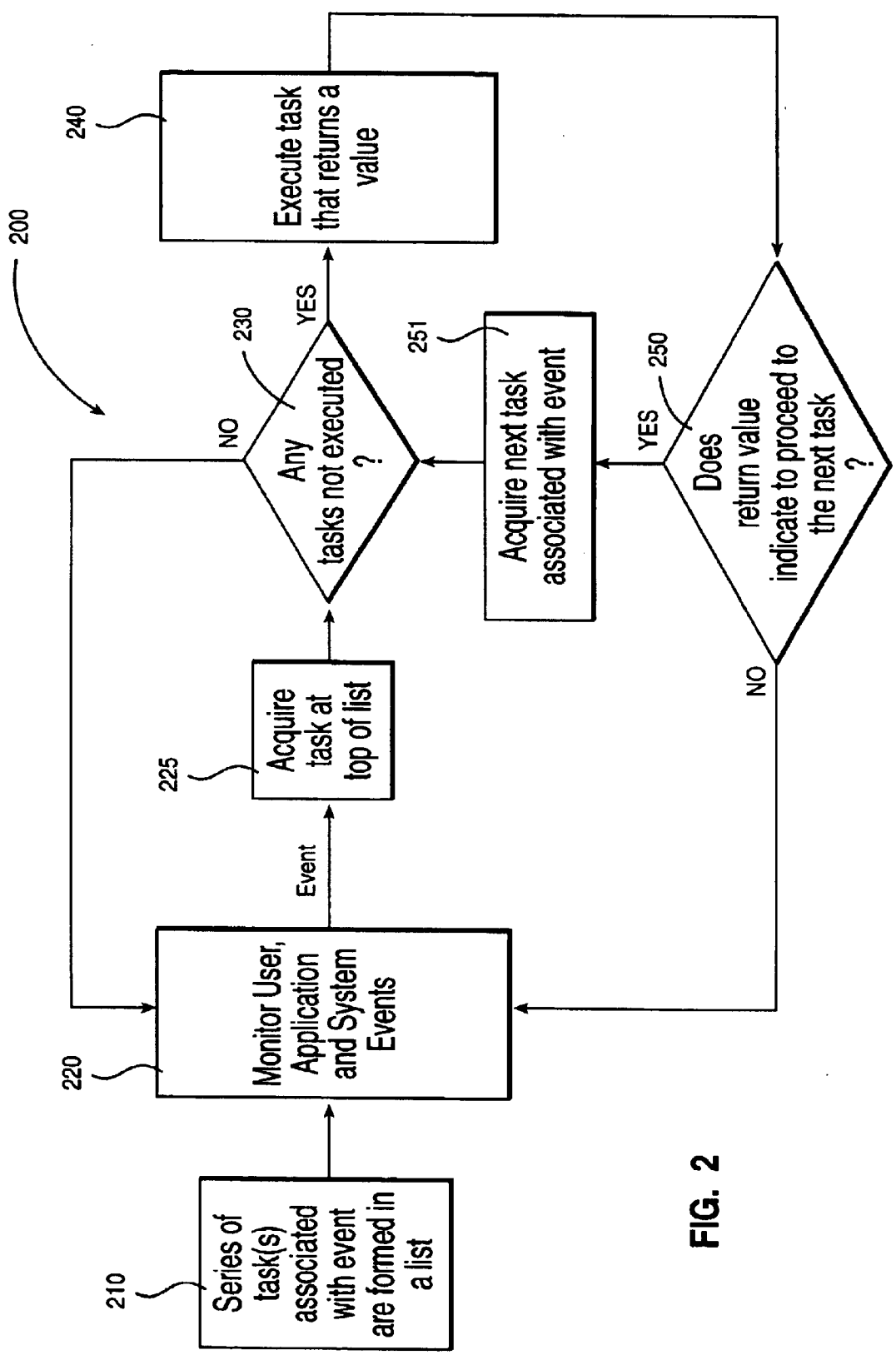
FIG. 2 illustrates the flow of an application extension manager residing in a memory of a computer system.

FIG. 2 illustrates an application extension manager 200 that resides in system memory 140. An application extension manager 200 extends or adds functionality to a separate program without changing that program. The separate program may be any type of application, such as a hockey game application. It is important to note that both the separate application and the application extension manager have default responses. However, when the term default response is used herein it refers to the default response of the application extension manager unless otherwise specified. An application extension manager 200 is a program that allows the execution unit 120 to execute a task or a series of tasks in an ordered list associated with an event. Each event has an ordered list associated with that particular event. A task is a set of executable instructions that allows the application extension manager 200 to add functionality to a separate program without changing that program. There are two types of tasks. The first type of task is a default task which is the first task in the ordered list associated with the event. The second type of task is a customized task which is added onto the list after the default task. That is, the default task is located on the bottom of the list and the added customized tasks are located on top of the default task, such as in a stack. Both the default and customized task may comprise executable instructions to produce an output in response to an event. The customized task may comprise a set of instructions that orders the execution unit 120 to produce a signal that when presented to a peripheral device, such as an audio output 180, produces what is termed a customized response. The default task may comprise a set of instructions that orders the execution unit 120 to produce a signal that when presented to a peripheral device, such as an audio output 180, produces what is termed a default response. A customized response is different from a default response. A default response is provided with the application extension manager for all applications. A customized response can be dynamically added either automatically by a configuration file or manually be a user. Generally, but not necessarily, customized responses are provided on a per application basis.

In step 210, an ordered list associated with an event is formed prior to the event occurring. The ordered list comprises a series of tasks that are each associated with the event. The tasks include both a default task and one or more customized tasks. A further description of the ordered list will be provided in FIG. 3.

In step 220, the application extension manager 200 monitors user, application and system events. Events are those that are prompted by activity internal to or external from the computer. For example, an event may be initiated by user activity (e.g., a key stroke upon the computer keyboard). Alternatively, the event may be derived from the execution of a particular triggering line of code within a program stored in computer memory. Regardless of its origin, an event is defined as stimuli which causes the execution unit 120 to execute an algorithm of the application extension manager 200.

Once an event occurs, the application extension manager 200 acquires the task at the top of the associated list in step 225. If there is a default task and at least one customized task associated with the event, then the top of the list will be a customized task.

The application extension manager 200 then determines whether there are any tasks in the list that have not been executed in step 230. There may be times when there are no tasks associated with the event. For example, there may be no response for the event and hence no task associated with the event. Hence, there are no more tasks to be executed and subsequently the application extension manager 200 returns to step 220. Furthermore, the application extension manager 200 may execute all the tasks in the list including the default task and hence have no more tasks to execute in the list. If there are no more tasks that need to be executed, then the application extension manager 200 returns to step 220.

However, if there are any tasks that have not been executed, then the task will then be executed in step 240. The first task to be executed will be the task on top of the list. If there are any more tasks to be executed, they will be tasks placed into the list prior to the last executed task. It is important to note that the execution of the task consists of executing the set of instructions associated with the task. The set of instructions may order the execution unit 120 to refrain from producing an output or may order the execution unit 120 to produce an output. Hence, even though the task is executed, an output may not be produced.

Furthermore, the executed task returns a value which indicates whether or not to proceed to the next task in the list. Step 250 determines whether the value indicates to proceed to the next task in the list. If the value indicates not to proceed to the next task, then the application extension manager 200 returns to step 220. However, if the value indicates to proceed to the next task, then the application extension manager 200 acquires the next lower task associated with the event in step 251. Then the application extension manager 200 returns to step 230. Application extension manager 200 will then execute the next task as long as the application extension manager 200 has not reached the end of the list. Hence, as long as the application extension manager 200 has not reached the end of the list and the executed task returns a value indicating the next task may be executed, the application extension manager 200 will execute the tasks from top to bottom in the reverse order they were placed in the list. A further description of the list is provided below.

Figure 3:
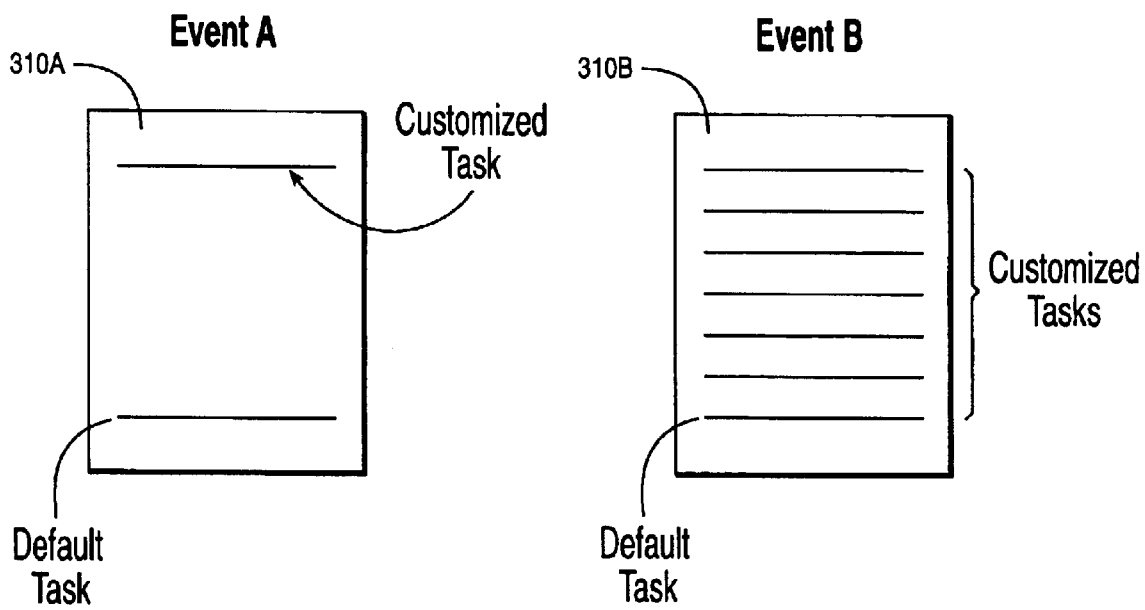
FIG. 3 illustrates an ordered list associated with an event.

FIG. 3 illustrates the ordered list associated with an event. The ordered list associated with an event is formed in system memory 140 of any tasks that are associated with the event prior to the event occurring. An event may be associated with a task or a plurality of tasks or no tasks at all. The list is a last-in-first-out (LIFO) list in which the default task is always the first task in the list. If there are any customized tasks, they are put onto the list after the default task. The following examples illustrate the ordered list.

Ordered list 310A is formed by the application extension manager 200 that is associated with event A. In ordered list 310A, a default task and a customized task is associated with event A. There are no other tasks associated with event A. Suppose that an event A occurs. Referring to FIG. 2, the application extension manager 200 will execute the task on top of the list in step 240 since the condition of step 230 is satisfied. The condition of step 230 is whether any tasks have not been executed. In the example, there are tasks that have not been executed. The customized task may comprise a set of instructions that orders the execution unit 120 to produce an output that differs from the default task.

For instance, a user may want to hear an audio output of "scores" instead of the default response of the application extension manager such as an audio output of "goal" when a player scores a goal in a hockey game application. It is important to note that the default response of the hockey game application is different from the default response of the application extension manager. For example, the default response of the hockey game application may be to display the score of the game when a goal is scored. However, the default response of the application extension manager may be to produce an audio output of "goal." Furthermore, the customized task may comprise a set of instructions that orders the execution unit 120 to produce an audio signal that is sent to an audio output 180 which may produce an audio sound of "scores" when a player scores a goal. "Scores" is the customized response. The customized task would then return a value to not execute the next task, the default task, because the user only wanted to hear the sound of "scores" and not "goal." Hence, the application extension manager 200 would return to step 220 from decision 250 in FIG. 2. Hence a customized response was produced rather than a default response without modifying the default response. The default response still exists, it just was not executed. That is, the set of instructions for the customized response not only provided for the sound "scores", but it also inhibited the execution of the default response.

There may be more than one customized task associated with the event. For example, ordered list 310B comprises a plurality of customized tasks and a default task associated with event B. Referring to FIG. 2, the application extension manager 200 will execute the task on top of the list in step 240 since the condition of step 230 is satisfied. The customized task may comprise a set of instructions that orders the execution unit 120 to produce an output that differs from the default task. The customized task may also comprise a set of instructions that orders the execution unit 120 to not produce any output. The customized task may simply return a value in which the value indicates that the application extension manager 200 should proceed to the next task.

Referring to the above example of the hockey game application, suppose there are two customized tasks and one default task. The last customized task put onto the list will be labeled #1 task. The second to the last customized task put onto the list will be labeled #2 task. The default task will be labeled the #3 task. The default task is the first task put onto the list.

The #1 task may have a set of instructions that orders the execution unit 120 to produce an audio output of "scores" when a goal is scored by the home team in the first period of the game. The #2 task may have a set of instructions that orders the execution unit 120 to produce an audio output of "awesome" when a goal is scored by the home team in the second or third period of the game. The #3 task may have a set of instructions that orders the execution 120 to produce an audio output of "goal" when a goal is scored in the hockey game. The output of "scores" and "awesome" would be a customized response; whereas, the output of "goal" would be a default response of the application extension manager. It is noted that the scoring of a goal in the hockey game constitutes an event.

Referring to FIG. 2, if a goal were scored by the home team in the second period of the hockey game application, then the application extension manager 200 would proceed from steps 225 and 230 to executing the task on top of the list in step 240. The top task is task #1. However, task #1 comprises a set of instructions that orders the execution unit 120 to not produce an output because this goal was not scored by the home team in the first period of the hockey game. Task #1 will instead return a value that informs the application extension manager 200 to proceed to the next task. Application extension manager 200 will acquire the next task associated with the event in step 251 and then proceed to step 230. Since the condition of step 230 is satisfied, i.e. there are tasks that have not been executed, task #2 will be executed. Task #2 comprises a set of instructions that orders the execution unit 120 to produce an audio output of "awesome" because a goal was scored by the home team in the second period of the hockey game. Task #2 would then return a value indicating to the application extension manager 200 to not proceed to the next task. Hence, the application extension manager 200 would revert to monitoring events at step 220 of FIG. 2. It is noted that in the above example, a customized response was produced rather than a default response without modifying the default response.

Referring to the above example, suppose that instead of a goal being scored by the home team in the second period of the hockey game application, a goal was scored by the visiting team. Referring to FIG. 2, if a goal were scored by the visiting team, then the application extension manager 200 would execute the task on top of the list in step 240. The top task is task #1. However, task #1 comprises a set of instructions that orders the execution unit 120 to not produce an output because this goal was not scored by the home team in the first period of the hockey game. Task #1 will instead return a value that informs the application extension manager 200 to proceed to the next task. Application extension manager 200 will acquire the next task associated with the event in step 251 and then proceed to step 230. Since there are tasks that have not been executed, task #2 will be executed. Task #2 comprises a set of instructions that orders the execution unit 120 to not produce an audio output of "awesome" because this goal was not scored by the home team in either the second or third period of the hockey game. Task #2 would then return a value indicating to the application extension manager 200 to proceed to the next task. Application extension manager 200 will acquire the next task associated with the event in step 251 and then proceed to step 230. Since there are tasks that have not been executed, task #3 will be executed. Task #3 comprises a set of instructions that orders the execution unit 120 to produce an audio output of "goal" because a goal was scored in the hockey game. Task #3 may return a value indicating to the application extension manager 200 to not proceed to the next task. Task #3 may also return a value indicating to proceed to the next task. However, there exists a condition of whether there are no more tasks in the ordered list to be executed in step 230. Since all the tasks in the ordered list have been executed, the application extension manager 200 reverts to monitoring events at step 220 of FIG. 2. The above example illustrates a default response being produced despite the fact that there exists one or more customized tasks.

In a further example, suppose that a user may want to hear an audio output of "home team scores" when a player on the home team scores a goal in a hockey game application. The default response of the application extension manager may be an audio output of "scores" when a goal is scored. The customized response of the application extension manager would then be "home team." Hence, the customized task may comprise a set of instructions that orders the execution unit 120 to produce an audio signal that is sent to an audio output 180 which may produce an audio sound of "home team" when a player on the home team scores a goal. The default task may comprise a set of instructions that orders the execution unit 120 to produce an audio signal that is sent to an audio output 180 which may produce an audio sound of "scores" when a player scores a goal.

Referring to the above example suppose there is just that one customized task and one default task in the list associated with scoring a goal. The customized task put onto the list will be labeled #1 task. The default task will be labeled the #2 task. The default task is the first task put onto the list.

Referring to FIG. 2, if a goal were scored by the home team of the hockey game application, then the application extension manager 200 would execute the task on top of the list in step 240. The top task is task #1. Task #1 comprises a set of instructions that orders the execution unit 120 to produce an audio output of "home team" because this goal was scored by the home team in the hockey game. Task #1 will then return a value that informs the application extension manager 200 to proceed to the next task. Application extension manager 200 will acquire the next task associated with the event in step 251 and then proceed to step 230. Since the condition of step 230 is satisfied, i.e. there are more tasks in the ordered list to be executed, task #2 will be executed. Task #2 comprises a set of instructions that orders the execution unit 120 to produce an audio output of "scores" because a goal was scored in the hockey game. Task #2 may then return a value indicating to the application extension manager 200 to not proceed to the next task. In which case, the application extension manager 200 would proceed from decision step 250 to monitoring events at step 220 of FIG. 2. If task #2 returns a value indicating to the application extension manager 200 to proceed to the next task, the application extension manager 200 would also proceed from decision step 250 to monitoring events at step 220 of FIG. 2 because all the tasks have been executed in the list. The above example illustrates a cascaded response. That is, the customized response of the application extension manager was appended to the prefix of the default response of the application extension manager. In other words, "home team" was prepended to "scores."

Referring to the above example, if instead a goal was scored by the visiting team of the hockey game application, then the application extension manager 200 would execute the task on top of the list in step 240. The top task is task #1. Task #1 comprises a set of instructions that orders the execution unit 120 to not produce an audio output of "home team" because this goal was scored by the visiting team in the hockey game. Task #1 will then return a value that informs the application extension manager 200 to proceed to the next task. Application extension manager 200 will acquire the next task associated with the event in step 251 and then proceed to step 230. Since the condition of step 230 is satisfied, i.e. there are more tasks in the ordered list to be executed, task #2 will be executed. Task #2 comprises a set of instructions that orders the execution unit 120 to produce an audio output of "scores" because a goal was scored in the hockey game. Task #2 may then return a value indicating to the application extension manager 200 to not proceed to the next task. In which case, the application extension manager 200 would proceed from decision step 250 to monitoring events at step 220 of FIG. 2. If task #2 returns a value indicating to the application extension manager 200 to proceed to the next task, the application extension manager 200 would also revert to monitoring events at step 220 of FIG. 2 because all the tasks in the list have been executed. The above example illustrates a default response of the application extension manager being produced despite the fact that there exists a customized task.

Figure 4:
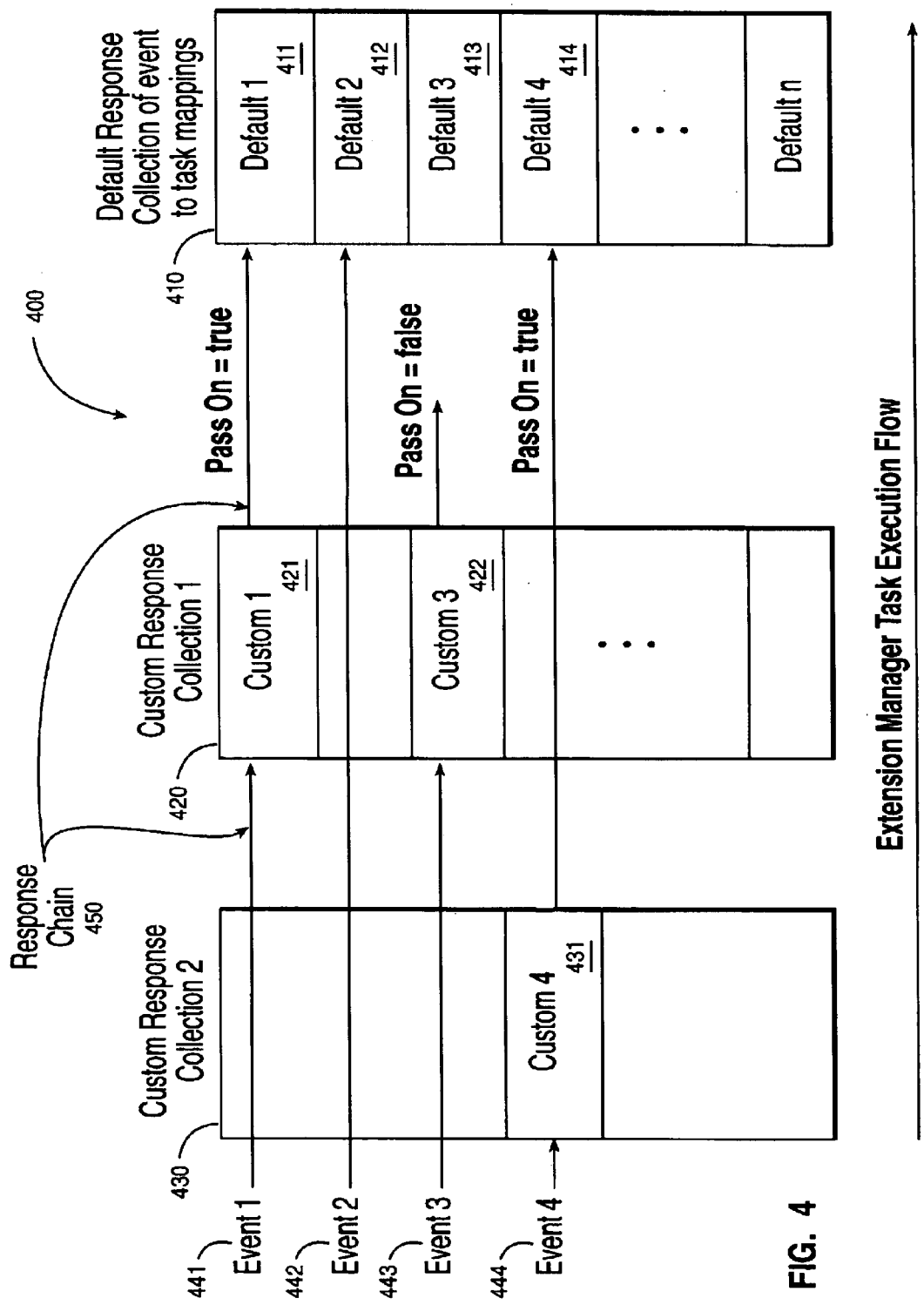
FIG. 4 illustrates a set of event to task mappings and the task execution flow within an application extension manager.

FIG. 4 illustrates a further embodiment 400 of this application where the default application extension 410 is defined as a collection of event to task mappings. Each task defines the default response executed by the application extension manager with respect to a corresponding event triggered for any given application. Furthermore, FIG. 4 illustrates two customized response collections, 420 and 430, where each collection defines a set of tasks which customize the previously registered responses to selected events. The registration of each collection defines a set of tasks that are appended to a linked list of tasks to be executed in response to a specific event by the application extension manager. The appending of tasks to a linked list forms an application extension response chain to a specific event such as the response chain 450 indicated by the arrows connecting the event 441 and tasks 421 and 411. A task registered in the chain has the options of changing the response and breaking the chain or augmenting the response and cascading into previously linked tasks in the chain. This functionality allows an application extension author to selectively modify the response to specific events in the system without altering all the previously registered, default or otherwise, application extensions.

To further illustrate this Event 1, 441, defines an event generated by a text highlighting change event. Event 2, 442, is a focus change event. Event 3, 443, is a scroll bar value change notification. Event 4, 444, is an application title activation event.

Default response 411 to event 1, 441, in the default response collection speaks the highlighted text whenever it changes. The default response 412 to Event 2, 442, is to speak a component's role whenever a component receives focus. The default response 413 to Event 3, 443, in the default response collection 410 speaks a scroll bar's value with respect to a scroll bar's size whenever a scrollable changes its value. The default response 414 to Event 4, 444, speaks an applications title text whenever an application is activated. This collection defines the total default application extensions response to all applications.

Custom response collection 1, 420, defines a customized response collection to an IBM corporate phone directory program called "BluePages." This customization will only be appended to the default response for this application. This collection only needs to customize the responses to Event 1, 441, and, Event 3, 443. In this example all other responses to events will be handled by the default collection set as there has been no previously registered customization. This collection's response 421 to event 1, 441, will be to add pauses between all text spoken in a highlight of text in its specific list box search result. Each list entry contains not only the person's name but also their e-mail address, phone number, and job description. To clearly hear all the text associated text for a person as the user navigates the list box, a pause was needed. The customized response 422 to Event 3, 443, is to stop saying any scroll bar change information since this is too distracting to the user. Since the custom response 422 to Event 3, 443, is appended to the default response 413, the custom response would simply perform no response and indicate to the application extension manager that processing should not pass on to previously registered tasks. All other Events triggered would automatically be passed on the default response collection.

Custom response collection 2, 430, defines a customized response collection prototype that a developer want to try. In this example collection 2, 430, defines a single customization 431 to Event 4, 444, which appends the words to speak "IBM" for any given application title when an application is activated. This customized response 431 will then indicate to the application extension manager that execution should then be passed off to the previously registered responses to Event 4, 444, after speaking "IBM". In this example the only previously registered task in response to this event is Default 4 414 defined in the default response collection 410. Since the default response 414 to Event 4, 444, is to speak the application title text. In the case of application "BluePages" the application extension response to the system would be to speak "IBM Blue Pages" for application BluePages. If the developer likes this feature the event response could be incorporated into Custom response collection 1, 420.

It is important to note that while the present invention has been described in the context of a fully functioning data processing system, those of ordinary skill in the art will appreciate that the processes, means, and functions of the present invention are capable of being distributed in the form of a computer usable medium having computer readable instructions as well as in a variety of other forms. The present invention applies equally regardless of the particular type of signal bearing media actually used to carry out the distribution. Examples of computer readable media include recordable-type media such as floppy disc, hard disk drive, RAM, CD-ROMs, DVD-ROMs, and transmission-type media such as digital and analog communication links, wired or wireless communications links using transmission forms such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art For example, although the description herein has centered around an application extension manager that enhances a user interface of an application program by providing audio output responses, other application extension managers could be used. For example, a system running an application extension manager may utilize two display monitors so that the visually displayed output from an executing application program may be enhanced. For example, the application extension manager may enhance the functionality of an executing program by enlarging the displayed output a predetermined amount on the second monitor without causing any modifications to the executing program. Since it may not be beneficial for every executing application program on the system to have all of its output enlarged by the predetermined amount as defined by the default tasks of the application extension manager, the present invention would enable the default output to be customized. In some cases, the customized task may just provide a different predetermined amount of enlargement. In this case, the customized task would then inhibit the default task from executing. In another case, the customized task may not only want the displayed output enlarged, but also have the output blink, or be displayed in a certain color, or have some other attribute besides size. In this other case, the customized task would not inhibit the linked default task from also executing since the enlarged output is also desired.

In addition, although the preferred embodiments herein have described enhancing the functionality of a user interface of an executing application program, other areas of the program's functionality can be enhanced by this invention.

Also, a preferred embodiment has been described with reference to a list of customized responses with respect to a given event. However, there may also be a collection of customized tasks wherein the collection contains customized tasks for every response desired to be modified. As such a streamlined process is provided for defining the net differences needed to customize the set of default responses.

Various modifications and changes may be made without departing from the spirit and scope of the invention as set forth in the claims. The system, methods, and program function described herein may be implemented using many combinations of hardware and/or software, and at one or more of many different levels of hardware and/or software, as is the case with many computer-related applications. It is intended that the following claims be interpreted to embrace all such modifications and changes.

Although the system and method of the present invention is described in connection with several embodiments, it is not intended to be limited to the specific forms set forth herein, but on the contrary it is intended to cover such alternatives, modifications, and equivalents, as can be reasonably included within the spirit and scope of the invention as defined by the appended claims.

What is claimed is:

1. A computer system, having a processor and memory, comprising:
   a first executing application;
   a second application, executing concurrently with the first application;
   means, within the second application, for monitoring a plurality of events wherein any given event is capable of causing the processor to execute instructions;
   means, within the second application, for separately associating a default task and at least one customized task with each one of at least one of the plurality of events, wherein the default task and the at least one customized task comprises an ordered list of task, and wherein each task comprises a set of executable instructions causing a deterministic responses, and wherein the default task is a last task in the ordered list for execution; and
   means for executing, upon an occurrence of one of the at least one of the plurality of events, at least one of the tasks, wherein each customized task indicates whether a next task in the ordered list will execute;
   whereby the second application provides additional functionality, through each deterministic response, to the first application while the first application remains unmodified.

2. The computer system of claim 1 wherein the second application executes each of the tasks according to an ordered list of tasks.

3. The computer system of claim 2 wherein the ordered list is a last-in-first-out-linked list.

4. The computer system of claim 3 wherein the default task is a first task in the linked list.

5. The computer system of claim 1 wherein a given one of the at least one customized tasks is enabled to inhibit execution of the default task.

6. The computer system of claim 1 wherein the additional functionality, provided by the second application, comprises at least one extension to the first application.

7. The computer system of claim 6 wherein the at least one extension comprises creating a cascaded response to a specific event.

8. The computer system of claim 6 wherein the at least one extension comprises creating a different deterministic response for a specific event.

9. The computer system of claim 1 wherein the second application is a system application that remains executable for each application running in the system.

10. The computer system of claim 1 wherein the second application is an extension to an operating system of the computer system.

11. The computer system of claim 1 wherein a given one of the plurality of events originates from within the first application.

12. The computer system of claim 1 wherein a given one of the plurality of events originates externally to the first application.

13. A method, carried out in a computer system, comprising:

executing a first application;

executing a second application concurrently with the first application;

monitoring, by the second application, a plurality of events wherein any given event is capable of causing a processor of the computer system to execute instructions;

separately associating, within the second application, a default task and at least one customized task with each one of at least one of the plurality of events, wherein the default task and the at least one customized task comprises an ordered list of tasks, and wherein each task comprises a set of executable instructions causing a deterministic response, and wherein the default task is a last task in the ordered list for execution; and executing, upon an occurrence of one of the at least one of the plurality of events, at least one of the tasks, wherein each customized task indicates whether a next task in the ordered list will execute.

14. The method of claim 13 wherein the step of executing at least one of the tasks further comprises executing each of the tasks according to an ordered list of tasks.

15. The method of claim 14 wherein the step of-executing at least one of the tasks further comprises determining whether subsequent tasks in the ordered list of tasks may be executed.

16. A computer usable medium, having computer readable program instructions, comprising:

means for enabling execution of the computer readable program instructions concurrently with an execution of a first application program;

means for enabling a monitoring of a plurality of events wherein any given event is capable of causing a processor to execute instructions;

means for separately associating a default task and at least one customized task with each one of at least one of the plurality of events, wherein the default task and the at least one customized task comprises an ordered list of tasks, and wherein each task comprises a set of executable instructions causing a deterministic response, and wherein the default task is a last task in the ordered list for execution; and means for causing an execution of at least one of the tasks upon an occurrence of one of the at least one of the plurality of events, wherein each customized task indicates whether a next task in the ordered list will execute;

whereby the computer readable program instructions provides additional functionality, through each deterministic response, to the first application while the first application remains unmodified.

* * * * *